United States Patent [19]

Tano et al.

[11] Patent Number: 5,146,537

[45] Date of Patent: Sep. 8, 1992

[54] METHOD FOR JUDGING WHETHER CONDITIONS ARE SATISFIED BY USING A NETWORK HAVING A PLURALITY OF NODES REPRESENTING THE CONDITIONS

[75] Inventors: Shunichi Tano, Machida; Motohisa Funabashi, Sagamihara; Shoichi Masui, Kawasaki; Seiji Sakaguchi, Yokohama, all of Japan

[73] Assignee: Hitachi, Ltd., Tokyo, Japan

[21] Appl. No.: 368,958

[22] Filed: Jun. 13, 1989

Related U.S. Application Data

[63] Continuation of Ser. No. 883,959, Jul. 10, 1986, abandoned.

[30] Foreign Application Priority Data

Jul. 12, 1985 [JP] Japan .................. 60-152204

[51] Int. Cl.$^5$ .............................................. G06F 7/06
[52] U.S. Cl. ........................... 395/1; 364/DIG. 1; 364/DIG. 2; 364/274; 364/274.1; 364/274.2; 364/274.3; 364/274.7; 364/972; 364/972.2; 364/972.3
[58] Field of Search .............. 364/200, 900, 513, 419, 364/130, 513.5, 413; 382/14, 15, 36–39

[56] References Cited

U.S. PATENT DOCUMENTS

| | | | |
|---|---|---|---|
| 4,286,330 | 8/1981 | Isaacson | 364/200 |
| 4,599,692 | 7/1986 | Tan et al. | 364/513 |
| 4,599,693 | 7/1986 | Denenberg | 364/513 |
| 4,628,435 | 12/1986 | Tashiro et al. | 364/130 |
| 4,635,199 | 1/1987 | Muraki | 364/419 |
| 4,670,848 | 6/1987 | Schramm | 364/513 |
| 4,675,829 | 6/1987 | Clemenson | 364/513 |
| 4,704,695 | 11/1987 | Kimura et al. | 364/513 |
| 4,761,746 | 8/1988 | Tano et al. | 364/513 |

FOREIGN PATENT DOCUMENTS 60-134349  7/1985  Japan .................. 364/200

OTHER PUBLICATIONS

T. McDermott et al. "Production System Conflict Resolution Strategies", Department of Computer Science, Carnegie Mellon University, (Dec. 1976), pp. 1–20.

Forgy, C. L. "Rete: A Fast Algorithm for the Many Pattern/Many Object Pattern Match Problem." Artificial Intelligence, vol. 19, No. 1, (1982), pp. 17–37.

Primary Examiner—David Y. Eng
Assistant Examiner—Robert B. Harrell
Attorney, Agent, or Firm—Antonelli, Terry, Stout & Kraus

[57] ABSTRACT

A method for generating a network to cope with a conditional part or an IF part having a comparison between variable data and a logical sum between comparisons which appear in a Rete network adopted in a production system using the knowledge technology scheme. In association with an intra-node, a candidate node is disposed in another conditional clause referencing a variable, and a data which was previously accepted but which did not satisfy the conditions or a data most likely to pass through the network is stored in the candidate node in advance. For the intra-node in the object processing, the value of the candidate node is loaded for judging the conditions.

8 Claims, 14 Drawing Sheets

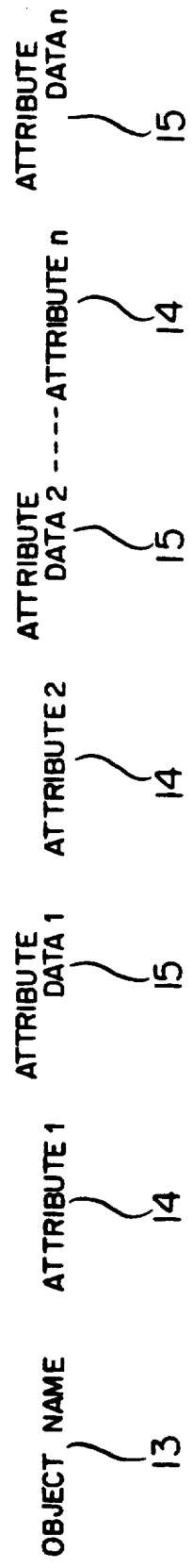
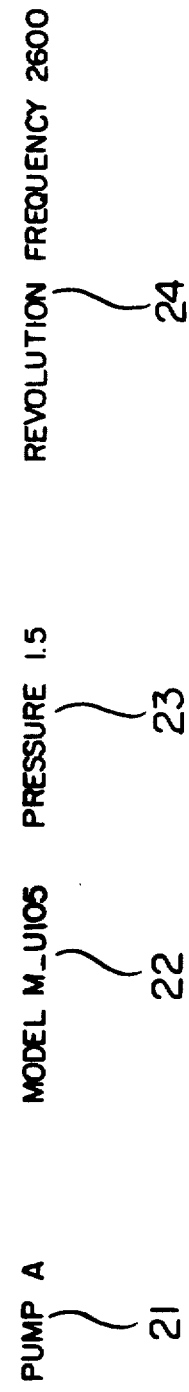
FIG. 2A OBJECT DATA
FIG. 2B OBJECT DATA EXAMPLE

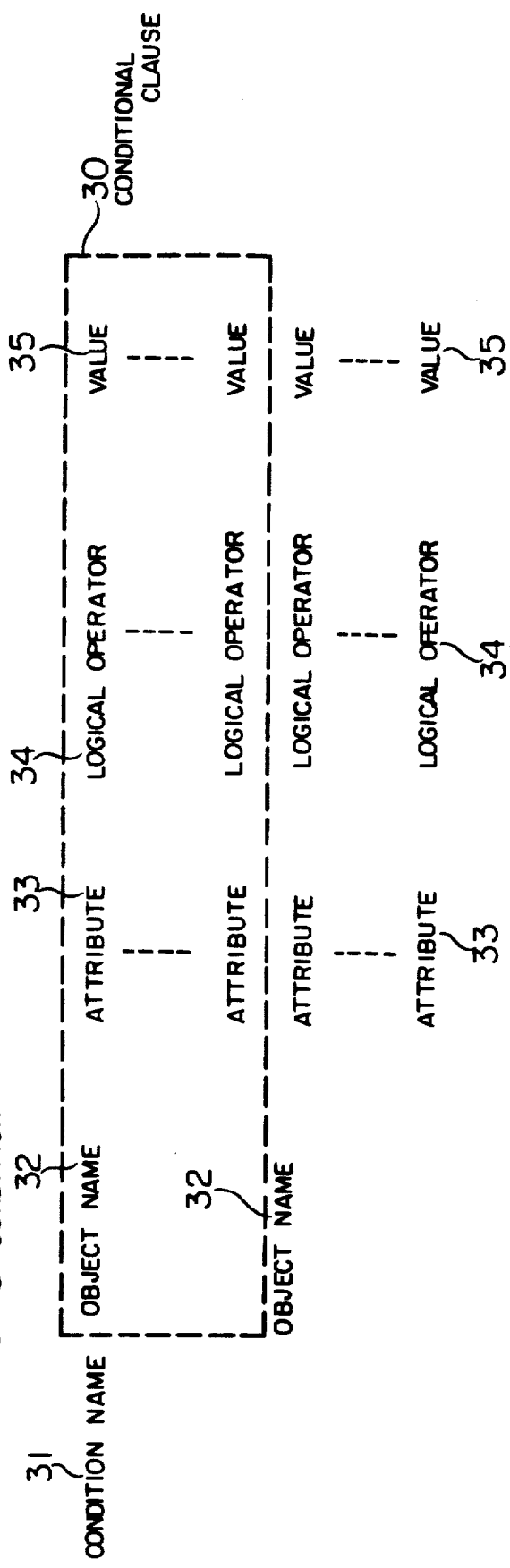

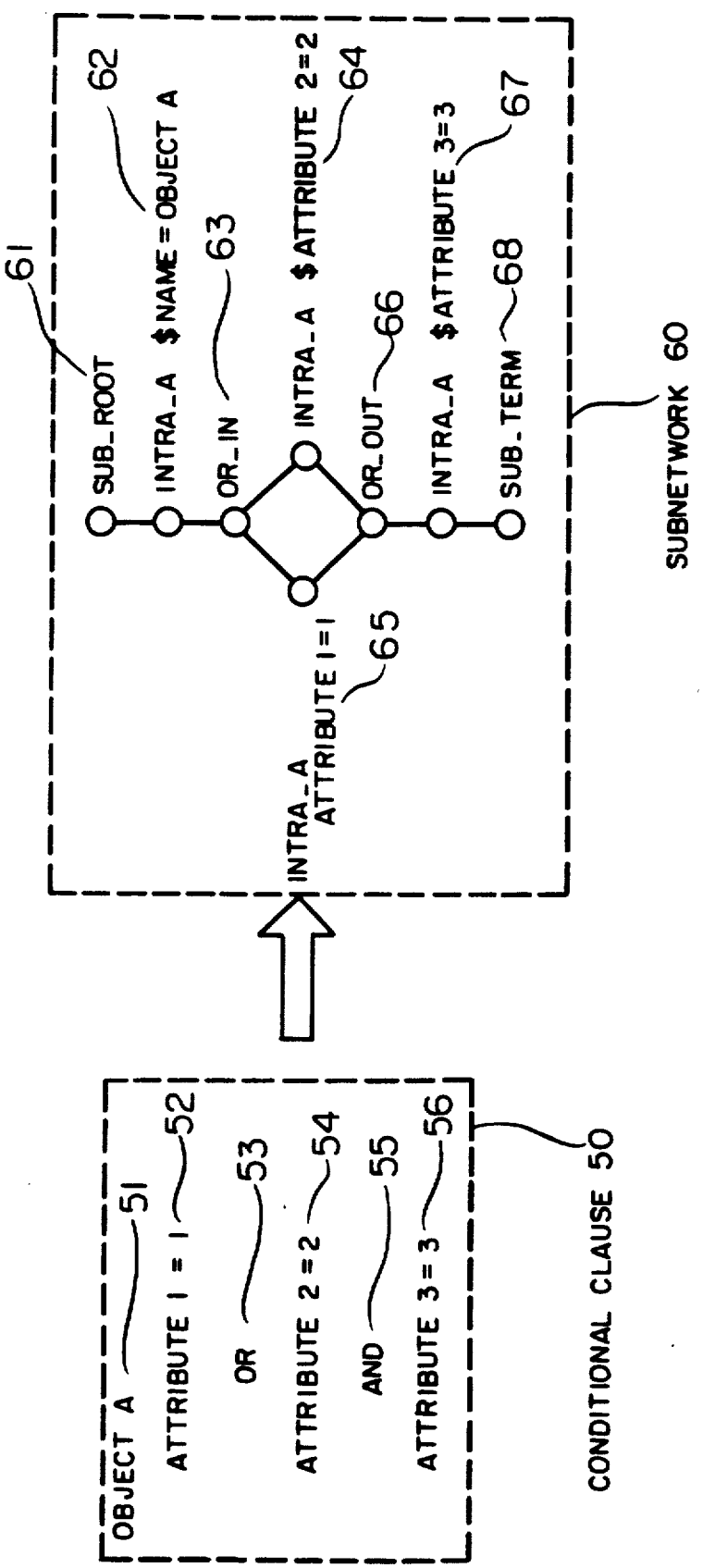
FIG. 5 SUBNETWORK

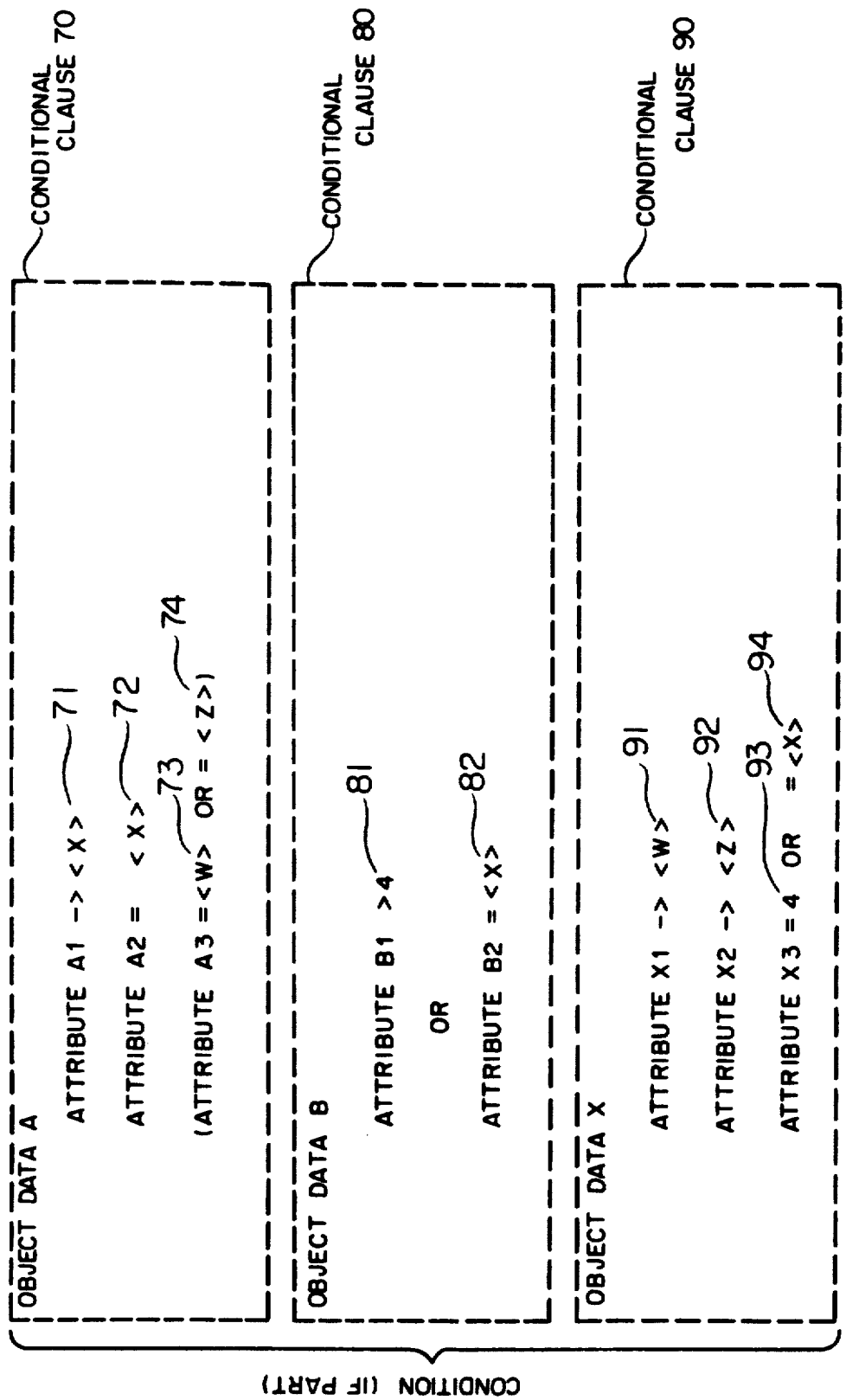

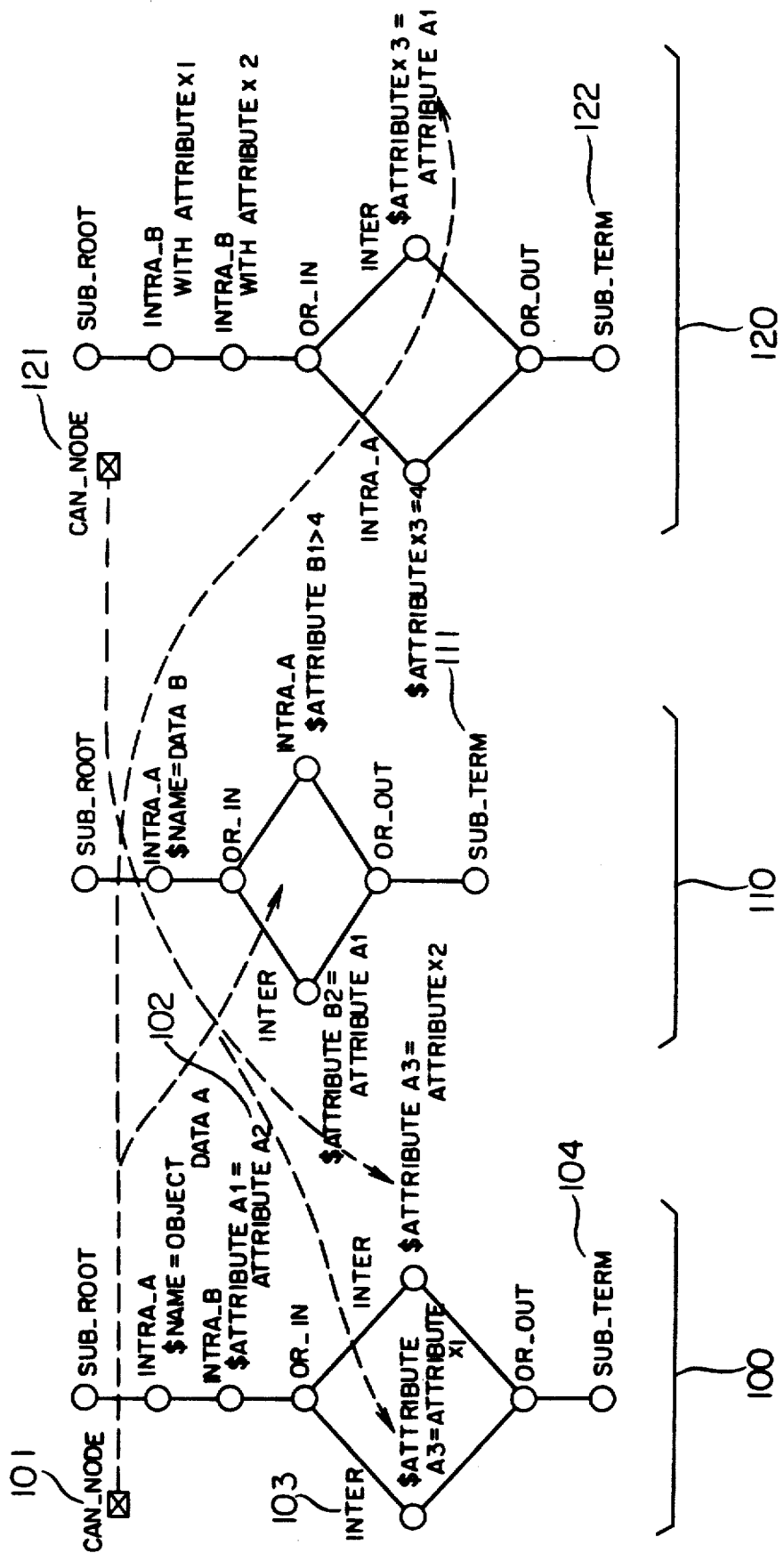
FIG. 7 (CONDITIONAL CLAUSES OF FIG. 6)

MERGE OF SUBTERMS

FIG. 9 INTEGRATION OF SUB_ROOT'S

FIG. 11

```
IF ( <OBJECT OF TYPE A >
     ①  $ TYPE   = A
        $ SLOT A2 -> <SLOT A2 OF TYPE A>
        $ SLOT A3 -> <SLOT A3 OF TYPE A>
        $ SLOT A4 -> <SLOT A4 OF TYPE A>
     ②  $ SLOT A  > <SLOT B1 OF TYPE B>
              OR  > <SLOT C1 OF TYPE C>
              OR  > <SLOT D1 OF TYPE D>)

( <OBJECT OF TYPE B >
     ③  $ TYPE   = B
        $ SLOT B1 -> <SLOT B1 OF TYPE B>
        $ SLOT B3 -> <SLOT B3 OF TYPE B>
        $ SLOT B4 -> <SLOT B4 OF TYPE B>
     ④  $ SLOT B  > <SLOT A2 OF TYPE A>
              OR  > <SLOT C2 OF TYPE C>
              OR  > <SLOT D2 OF TYPE D>)

( <OBJECT OF TYPE C >
     ⑤  $ TYPE   = C
        $ SLOT C1 -> <SLOT C1 OF TYPE C>
        $ SLOT C2 -> <SLOT C2 OF TYPE C>
        $ SLOT C4 -> <SLOT C4 OF TYPE C>
     ⑥  $ SLOT C  > <SLOT A3 OF TYPE A>
              OR  > <SLOT B3 OF TYPE B>
              OR  > <SLOT D3 OF TYPE D>)

( <OBJECT OF TYPE D >
     ⑦  $ TYPE   = D
        $ SLOT D1 -><SLOT D1 OF TYPE D >
        $ SLOT D2 -> <SLOT D2 OF TYPE D >
        $ SLOT D3 -> <SLOT D3 OF TYPE D >
     ⑧  $ SLOT D  > <SLOT A4 OF TYPE A >
              OR  > <SLOT B4 OF TYPE B >
              OR  > <SLOT C4 OF TYPE C >)
       - - - - - -
THEN
```

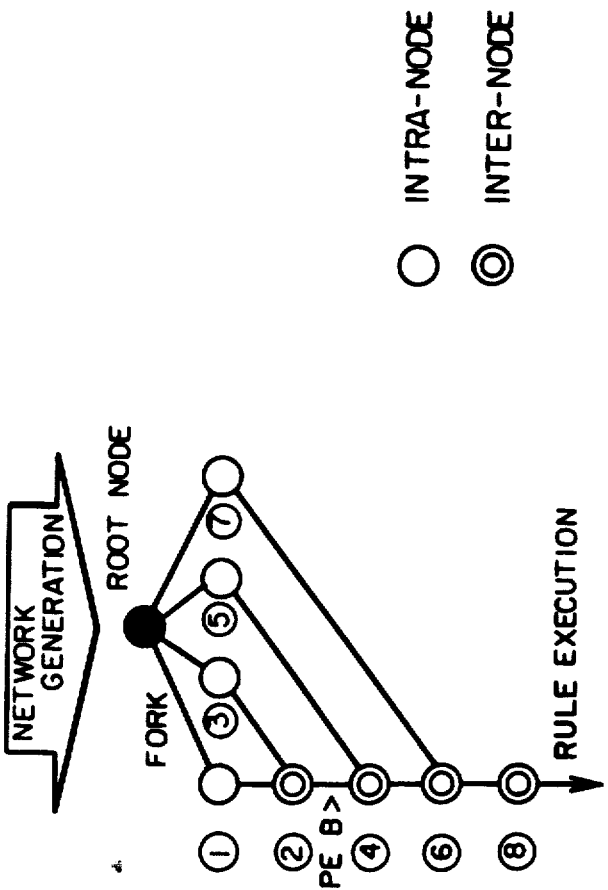

● OR NODE
◎ INTER-NODE

METHOD FOR JUDGING WHETHER CONDITIONS ARE SATISFIED BY USING A NETWORK HAVING A PLURALITY OF NODES REPRESENTING THE CONDITIONS

This application is a continuation of application Ser. No. 883,959 filed Jul. 10, 1986, now abandoned.

BACKGROUND OF THE INVENTION

The present invention relates to a system for judging whether or not a plurality of conditions are satisfied, and in particular, to a high-speed rule processing system for processing rules suitable for a forward inference in a knowledge base using knowledge technology.

As a method for judging whether or not a plurality of conditions are satisfied, there has been known a method in which a disrimination net is used. For example, Charles L Forgy has proposed, in Rete: A Fast Algorithm for the Many Pattern/Many Object Pattern Match Problem, ARTIFICIAL INTELLIGENCE Vol. 19, No. 1, 1982, 17-37, a system wherein conditions are converted into a network and objects called tokens each including a name of an object and at least a pair of an attribute or an attribute name and an attribute data are supplied to the network so as to compare the objects and patterns, thereby storing the states satisfying the conditions in storage locations associated with the respective nodes of the network. Since the network portions corresponding to the respective condition clauses are related to each other, to compare attribute data between different objects, these objects must be directly linked by use of a branch, and hence conditions become complicated. If the description of conditions includes a lot of "OR" operations selectively linking a plurality of conditions or a lot of compare operations comparing attribute variables between different network portions, there appear such problems that the size of the network exponentially increases, the processing speed is lowered, and the amount of information to be stored in the network is increased at the same time. In other words, these problems are caused by a method for representing a discrimination net in which a network must be directly linked by use of inter-nodes when attribute data is desired to be compared between objects by using variables. Such a system for processing complex conditions at a high speed has long been desired.

SUMMARY OF THE INVENTION

It is therefore an object of the present invention to provide a method for generating and processing a network in a system judging whether or not a plurality of conditions are satisfied which enables to achieve a high-speed processing of production rules containing complex conditions such as a comparison between attribute variables.

Another object of the present invention is to provide a knowledge base system with a pattern/object matching method implementing a network in which a comparison between different objects is linked by use of "OR". The problems that when the condition part or if part becomes complicated, the size of the network and the amount of the information to be stored therein rapidly increases and the execution speed is lowered at the same time have been found to be caused by that handling of conditional clauses comprising conditions in the network that are not independent. To solve these problems, the conditional clauses must be manipulated independently of each other; however, the conditions are related to each other, and hence the solution cannot be easily obtained.

According to the present invention, to overcome these problems, each group of conditional clauses constituting a network is virtually represented as an independent subnetwork and the relationships between the conditional clauses are expressed by use of virtual nodes, namely, candidate nodes and merge nodes, which enables the conditional clauses constituting the conditions to be handled independently of each other. In other words, instructions related to the conditions of objects are not clearly linked by use of inter-nodes; instead, each conditional clause of an object is expressed as an independent subnetwork corresponding to a condition clause in the LHS and a candidate node, CAN-NODE is provided to keep a candidate data item, thereby storing in a memory of the network the resultant states of Matching up to the latest matching for use in judging the current conditions.

BRIEF DESCRIPTION OF THE DRAWINGS

The present invention will be apparent from the following detailed description taken in conjunction with the accompanying drawings in which:

FIG. 1b is a flowchart showing a processing flow of the system of FIG. 1a;

FIG. 2A is a schematic diagram depicting an example of a method for representing tokens;

FIG. 2B is a schematic diagram depicting an example of a method for representing tokens;

FIG. 3 is a diagram illustrating an example of a method for representing conditions;

FIG. 4 is a schematic diagram showing an example of conditions;

FIG. 5 is a diagram depicting an example of a method for converting conditions into a network;

FIG. 6 is an explanatory diagram illustrating an actual example of complex rules;

FIG. 7 is a diagram showing an example of an operation for converting the rules of FIG. 6 into a network;

FIG. 11 is a diagram illustrating an example of an IF section having complex combinations of conditions;

FIG. 12 is a schematic diagram depicting an example in which one of 81 combinations derived from FIG. 11 is described in the IF part;

FIG. 13 is a diagram showing a network generated from the conditions of the IF part of FIG. 12;

DESCRIPTION OF THE PREFERRED EMBODIMENTS

A description will be given of an embodiment of the present invention with reference to FIGS. 1a-1b.

Figure 1A:
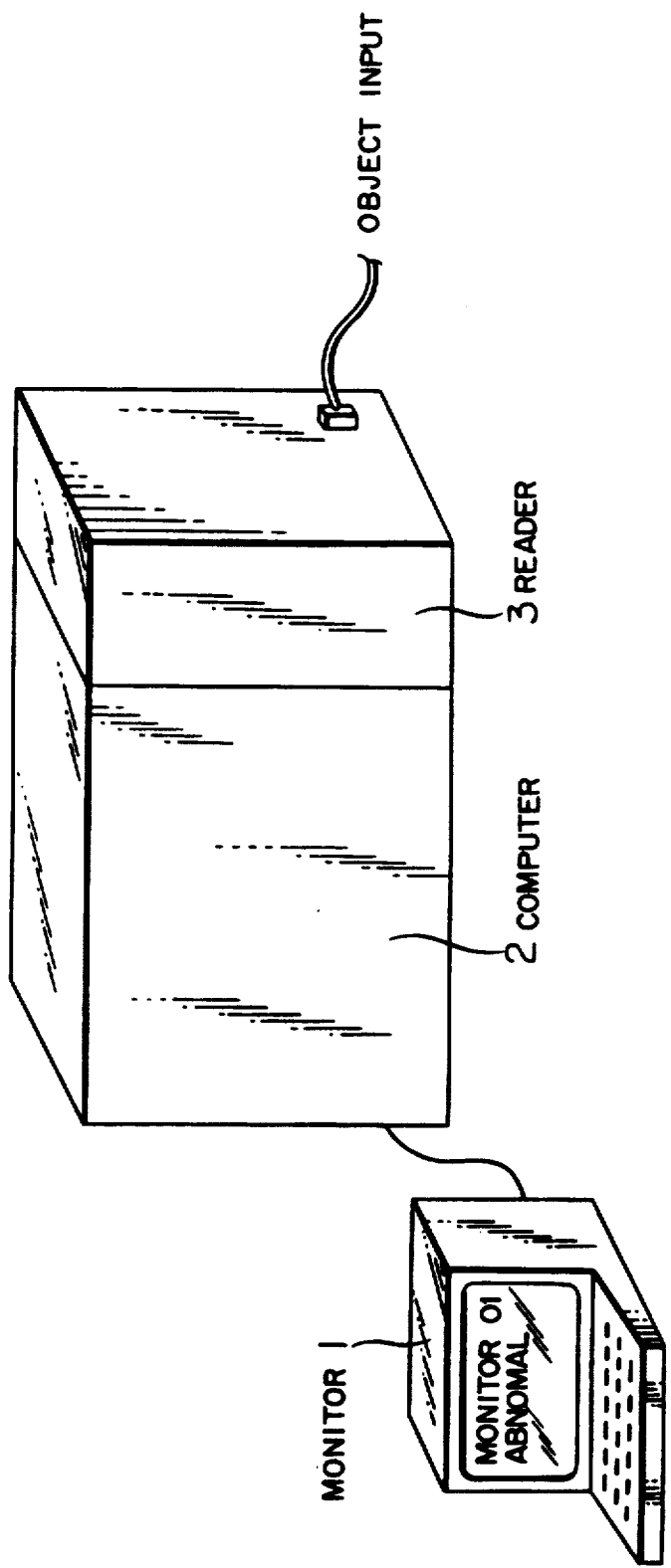
FIG. 1a is a schematic diagram illustrating an example of a system configuration of an embodiment according to the present invention.

Referring to FIG. 1a, there is shown a system configuration of an embodiment of the present invention. The system comprises a monitor 1 for displaying the matching or unmatching of conditions, namely, the results of comparison between patterns and objects, a computer 2 for computing the matching or unmatching of conditions, and a reader 3 connected to an external unit via a cable for reading objects.

Figure 1B:
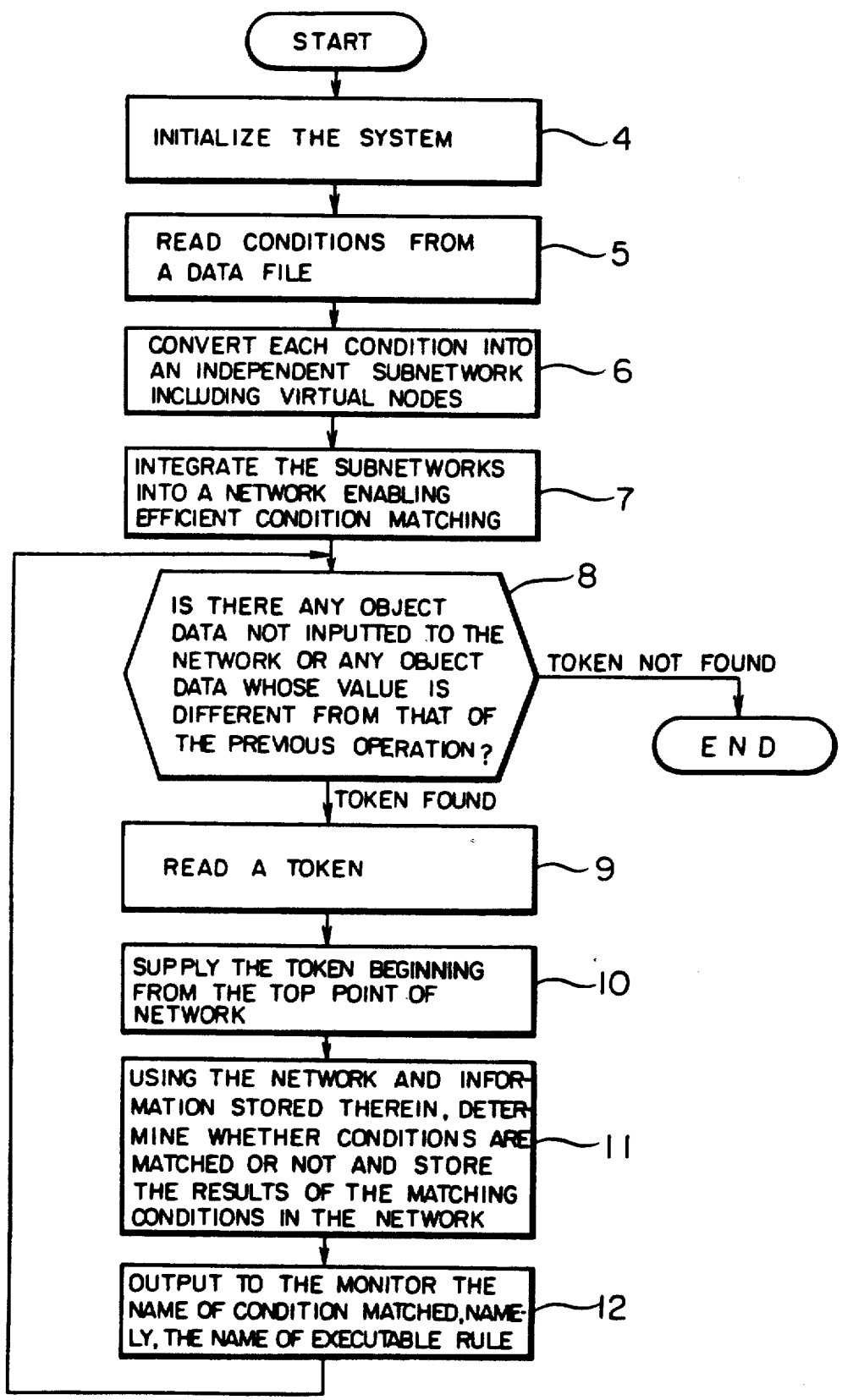

FIG. 1b is a flowchart showing a processing flow of the system of FIG. 1a. First, the units of the system and data areas of programs are initialized (step 4) and conditions to be judged, namely, the conditions described in an IF part of the production rules are read from a data file storing the conditions in advance (step 5). The conditions are then converted into a network represented by a tree structure including a plurality of nodes to be sequentially judged Namely, when the complex conditions appear, step 6 converts the conditions into subnetworks which includes virtual nodes and which are independent of each other, and then step 7 integrates the subnetworks into the network so as to enable an efficient matching.

From the steps 5-7, a network representing the conditions to be judged is obtained. In the subsequent processing, the conditions are judged to determine whether or not to be matched by use of the obtained network.

Step 8 checks the reader 3 to determine whether or not there exists another object to be inputted. If this is the case, steps 9-12 are executed to determine whether or not the conditions are satisfied. When there exists no object to be inputted, the processing is terminated.

In the step 9, data of an object is read through the reader 3, and then the data is compared with an element of a pattern defined at the top node or root node of the network (step 10). Since the object is subjected to a compare or judge operation at the next node connected to the current node, it seems that the data of the object flows from the root node of the network to the nodes located downstream thereof. In step 11, the condition matching is effected by use of the network and the information stored therein and the matching result is stored in the network. In step 12, a name of a condition determined to be matched, that is, a name of an executable rule is displayed on the monitor 1.

This system is characterized by a method for generating a network incorporated with virtual nodes and the like so as to effectively judge the matching and unmatching of conditions including complex descriptions (steps 6-7) and by a system for determining the matching of conditions by use of the network thus generated by introducing the virtual nodes (step 11). The method for generating and processing the network will be described herebelow.

The specific terms used in this context are defined as follows.

1. Object data

An object data describes the current state of an objective world with respect to an object. As shown in FIG. 2A, the object data comprises an object name 13 and pairs of an attribute (name) 14 and attribute data (value) 15. An actual example of description about a pump A 21 is shown in FIG. 2B wherein the attributes are the model 22, pressure 23, and revolution frequency 24 and the respective data items are M_U105, 1.5, and 2600. An object is called token and is caused to flow from the root node to the COND-TERM node in the network.

2. Condition

As shown in FIG. 3, a condition is described in an IF part of the production rules with respect to a state of an objective world. A condition comprises a condition name 31 and a description 30 related to at least a present state. The description 30 about a present state includes an object name 32, an attribute 33, a logical operator 34, and a value 35. A description of a present state is called a conditional clause. A conditional portion may include two or more clauses.

An actual example is shown in FIG. 4. A complex condition of FIG. 4 comprises a condition name of pump C revolution frequency abnormality 41 and a conditional clause related to two present states. In a first conditional clause 42, it is declared for the pump C 42 that the model is M_U105, that the condition is that the pressure is less than 1.5, and that the revolution frequency is x. Symbol "→" 45 indicates substitution and is used to substitute a variable, x enclosed with symbols < and > by a value. In a second conditional clause, the object name 46 is a variable, and hence an object satisfying a condition that the model is M_U105, the pressure is at least 2.5, and the revolution frequency is less than the variable x is searched and the object name of the resultant object is used to substitute the variable "pump X" 46.

That is, the condition of FIG. 4 is satisfied if an object of which the model is M_U105, the pressure is less than 1.5, and the name is pump C exists and if an object of which the model is M_U105, the pressure is more than 2.5, and the revolution frequency is less than that of the pump C exists. (The condition can be considered to include two conditions linked by "AND".)

As described above, complex conditions which are independent of each other and which include variables can be described. Moreover, conditional elements linked by "OR" can be contained in a conditional clause.

Next, a method for representing conditions by use of a network will be described. The types of nodes in the network include ROOT, FORK, OR_IN, OR_OUT, SUB_ROOT, SUB_TERM, MERGE, COND_TERM, INTRA_A, INTRA_B, and INTER, furthermore, there is provided a node called CAN_NODE which is a virtual node used to link associated conditional clauses.

If a plurality of conditional clauses in a description of an object, each conditional clause is independently converted into a subnetwork. A subnetwork begins with SUB_ROOT and ends with SUB_TERM and includes nodes such as INTRA, INTER, OR_IN, and OR_OUT.

A subnetwork generated for each conditional clause in a condition is linked by use of a MERGE node and ends with COND_TERM denoting the matching of the condition.

SUB_ROOT is connected by a ROOT node and thereby forms a network. Meanings of the nodes and the network generating method will be described.

Meanings of nodes

ROOT: Indicates the root node at the top point of a network. ROOT has n branches, where n=1, 2, . . . .

FORK: Is a node having two branches. FORK nodes are necessary to simplify the procedure which integrates two or more subnetworks into a network. Both branches of a FORK node are processed.

OR_IN: Indicates two branches associated with a logical sum.

OR_OUT: Indicates the confluence (termination) of two branches of the logical sum. It is possible that pass results for only one branch while the other branch is not processed.

SUB_ROOT: Indicates a root node of a subnetwork.

SUB_TERM: Indicates the end of a subnetwork.

Figure 8:
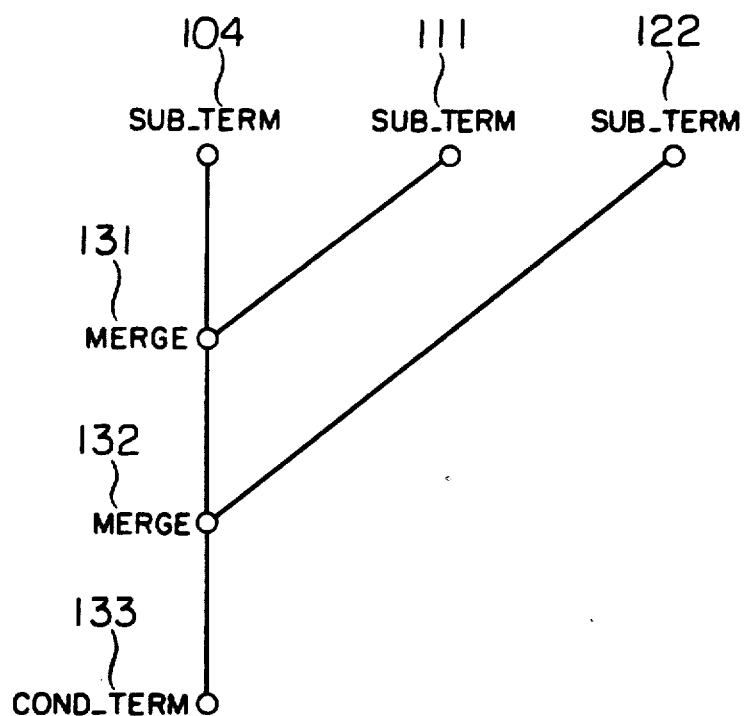
FIG. 8 is a schematic diagram depicting an example of an operation to link subnets into a condition.

MERGE: Indicates a node for linking the end of subnetwork (FIG. 8).

Figure 10:
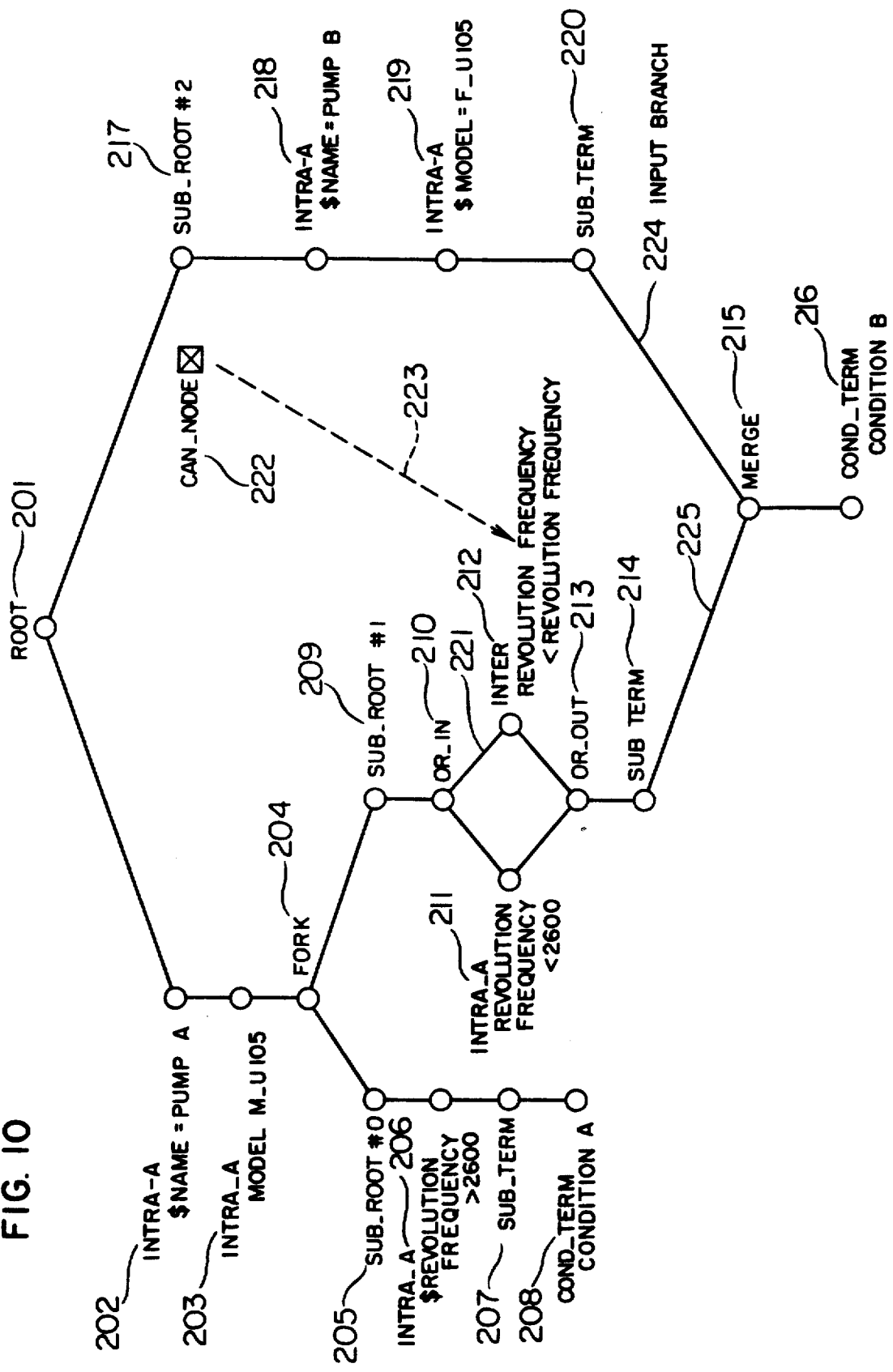
FIG. 10 is a schematic diagram showing an example of a network.

COND_TERM: Indicates a node for denoting the matching of a condition (FIG. 8, FIG. 10).

INTRA_A: Indicates a node for comparing an attribute data with a constant.

INTRA_B: Indicates a node for comparing an attribute data with another attribute data in an object.

INTER: Indicates a node for comparing values of attribute data between objects

CAN_NODE: Indicates a virtual node for comparing attribute data between different objects (FIG. 10, 222).

Network Generating Method

A method for generating a subnetwork will be described with reference to FIG. 5.

A conditional clause 50 is converted into a subnetwork 60 according to the following procedure.

(1) Node SUB_ROOT 61 is generated as the root node of the subnetwork.

(2) If an object name has been described, a special attribute name, $ name is used to convert an object 51 into a node 62, namely, INTRA_A ($ name=Object A). (See FIG. 5 for details.)

(3) When comparing attributes 1-3 with constants 1-3, descriptions 52, 54, and 56 are converted into nodes 65, 64, and 67, respectively.

(4) A node need not be added for AND 55. For a logical sum 53, two branches are provided by use of OR_IN 63 so that two terms of the logical sum operation are represented by nodes 64 and 65, respectively. The end of the two branches is linked by OR_OUT 66.

(5) Finally, SUB_TERM 68 is assigned to terminate the subnetwork.

Next, a conversion method for converting a more complex condition will be described with reference to FIGS. 6-7.

In an example of a condition illustrated in FIG. 6, there are included a comparison 72 between attribute data in an object using variables and comparisons 73, 74, 82, and 94 of attribute data between different object data. When all conditional clauses 70, 80, and 90 are satisfied, the condition of the IF part is satisfied, which is then outputted. The comparison 72 between attribute data in an object is converted into a node INTRA_B which effects a comparison for Attribute A1 = Attribute A2.

For the conditional clauses 70 and 90 in which variables are substituted by values for comparisons of items or attribute data between different object data, CAN_NODE 101 and CAN_NODE 121 are generated as shown in FIG. 7 (subnetworks 100 and 120) so that the comparisons with the variables are achieved through these CAN_NODE's. For example, the description 73 indicates a comparison between the values of the attribute A3 and the variable W. However, W can be executable only after the substitution takes place in the conditional clause 90, that is, the description 73 cannot be immediately executed. In place of the wait imposed by this situation, the attribute A3 is compared with a virtual or candidate value kept in CAN_NODE 121 generated in the subnetwork 120 converted from the conditional clause 90, thereby obtaining INTER node 103.

The procedure above enables the transformation of the conditional clauses into subnetworks which are independent of each other without nodes for referring and comparing data between different conditional clauses.

Next, each subnetwork is linked according to the associated condition.

The condition of FIG. 6 is converted into three subnetworks or subnets, 100, 110, and 120 as shown in FIG. 7; and Subterms 104, 111, and 122 thereof are linked by use of MERGE nodes 131 and 132 to be terminated by COND_TERM 133.

Figure 9:
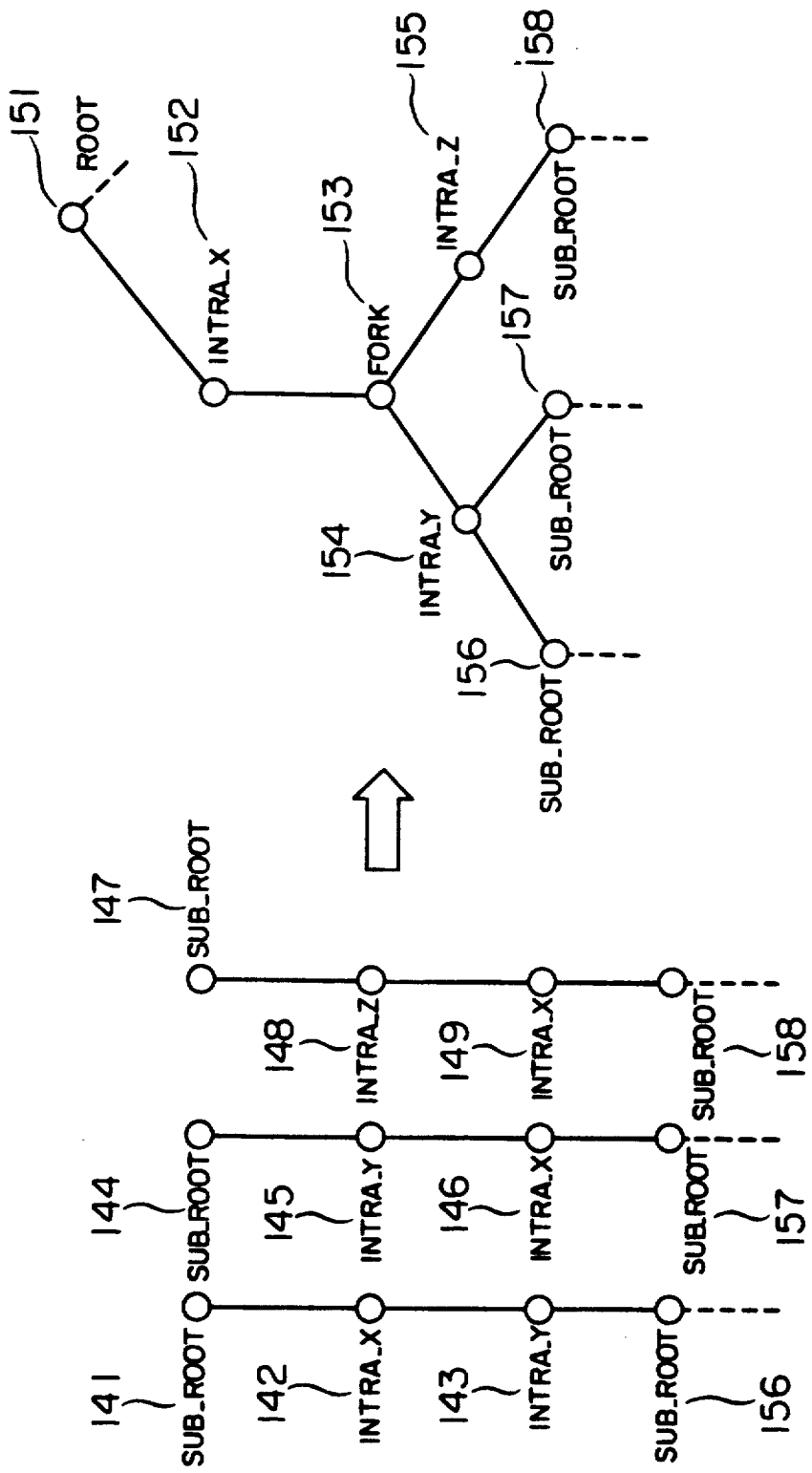
FIG. 9 is a diagram illustrating an example of an operation to generate a network from subnetworks.

Finally, SUB_ROOT's of the three subnetworks are linked by use of a ROOT node. In this linking operation, nodes commonly used in the subnets are assigned as common nodes for the linkage, and then branches are formed by use of FORK nodes. An example of this operation to derive the common node is shown in FIG. 9. In the schematic diagram of FIG. 9, the pairs of attribute and attribute data are assumed to be the same, and hence description thereof is omitted. Nodes 142, 146, and 149 are to be subjected to the same check. When INTRA_X's 146 and 149 are moved to locations preceeding INTRA_Y 145 and INTRA_Z 148, respectively, these three INTRA_X's can be treated as common items, thereby forming INTRA_X 152.

For subnetworks in which such common items are not found, the elements are grouped for each root node so as to supply data therethrough. A method for generating a network has been described.

Next, a description will be given of a method for determining whether or not a condition is satisfied by use of the generated network.

The object data is fed through a root node into the network so as to be checked at each node. When the object data reaches COND_TERM, the conditions located in the nodes constituting the path from the ROOT node to the COND_TERM are determined to be satisfied.

In the network, at input branches of the INTER node (for example, those of nodes 103 and 103' of FIG. 7), input branches of the SUB_TERM node (for example, those of nodes 104, 111, and 122 of FIG. 7), two input branches of the MERGE node (for example, two input branches of nodes 131 and 132 of FIG. 8), and an input branch of the COND_TERM node (for example, the input branch of the COND_TERM 133 of FIG. 8), the object data thus delivered through the network is stored.

At the CAN_NODE, the attribute data of an object which has just passed through the subnetwork or which may possibly pass therethrough is stored. The attribute data of "object data which has just passed or which may possibly pass through the subnetwork" includes (1) an object data for which the check is failed in the INTER node and (2) an object data that reaches the SUB_TERM.

Referring now to FIG. 10, a method for executing a network processing will be described.

This network is obtained by converting two conditions on pumps A and B whose model numbers are M_U105 and F_U105, respectively, namely:

Condition A: The revolution frequency of the pump A is more than 2600.

Condition B: The revolution frequency of the pump A is less than 2600 or that of the pump B.

In the initial state, no data has been stored in this network. Assume that an object data or a token of the pump A of which the model number is M_U105 and the revolution frequency is 2800 is fed into the root node of the network. At the ROOT 201, one of the branches, namely, SUB_ROOT 217 is stored in the stack and processing of the INTRA_A 202 node is executed. Since the object data name is pump A, the processing of this nodes completes successfully, and hence the subsequent node, INTRA_A 203 is processed. Since the model number is M_U105, the processing of this node is successfully achieved. In the next FORK node 204, like in the root node, one of the branches, namely, SUB_ROOT 209 is stored in the stack. SUB_ROOT 205 reads the subnetwork number stored in the input branch of the branch destination node, SUB_ROOT 209 of the FORK node 204 and stores the subnetwork number. The check of the INTRA_A 206 is successfully finished, and in SUB TERM 207 and COND_TERM 208, the subnetwork number 0(#0) and pump A are stored in the form of (0 pump A). The object data reaches the COND_TERM 208, which means that the condition A is determined to be satisfied.

Since the branch destination SUB_ROOT 209 of the FORK 204 is stored in the stack, processing is resumed from the SUB_ROOT 209. In this node, the subnetwork number #1 is retrieved, and then the other branch destination INTER 212 is stored in the stack at OR_TN 210. Since the comparison, 2800<2600 conducted in INTRA 211 results in a fail, the processing is resumed from the INTER 212 stored in the stack at the OR_IN 210. In this node, for the object data delivered, the subnetwork number #1 and pump A are stored in the form of (1 pump A) in an input branch 221. Although a comparison of the value with respect to CAN_NODE 222 is instructed to the INTER 212, no data has been stored in the CAN_NODE 222; consequently, the processing results in a fail and is resumed from the SUB_ROOT 217 stacked in the ROOT 201. In the SUB_ROOT 217, the subnetwork number #2 is read. The next INTRA_A 218 fails because the attribute data of the object data is not pump B. Since the stack contains no data, the processing to feed "pump A" through the network results in a fail and is thus terminated.

Next, assume that an object data of which the model number is F_U105 and the revolution frequency is 3000 is delivered into the network. Like in the case of pump A, the processing is achieved as follows: ROOT 201, INTRA_A 202 resulting in a fail, SUB_ROOT 217, INTRA_A 218, INTRA_A 219, and SUB_TERM 220 where (2 pump B) is stored. Next, MERGE 215 is activated and the same information, (2 pump B) is also stored in the input branch 224 to be checked for its integrity against the information stored in the input branch 225. However, no data has been stored in the input branch 225, the processing fails. Since this subnetwork #2 has CAN_NODE, the processing of CAN_NODE 222 is executed. First, the name, pump B of the object data that has passed the SUB_ROOT 217 is stored in the CAN_NODE 222, and then the processing of INTER 212 is achieved via an input branch 223. Here, the check of Revolution frequency of pump A 2800<Revolution frequency of the object data 3000 results in a pass, an information item, (1 pump A, 2 pump B) is generated and transferred to the next node. This information is stored in SUB TERM 2; moreover, MERGE 215 stores the information in an input branch 225. Information (1 pump A, 2 pump B) has been stored in the input branch 225, which indicates that the pump B of the subnetwork 2 is necessary for the pump A to pass through the subnetwork 1. On the other hand, (2 pump B) has been stored in the input branch 224, which indicates that the pump B has passed through the subnetwork 2. As a consequence, the integrity between the pump A and pump B is maintained, and hence the information (1 pump A, 2 pump B) is delivered to the next node and this information is stored in COND_TERM 216, which means that the condition B is determined to be satisfied.

In a case where the object data is changed, the original object data is fed into the network in the completely same fashion so as to delete all information about the object data from the branches containing such information, and thereafter new object data is supplied to the network.

The embodiment of the present invention described above will be further understood through the following discussion. FIG. 11 is a diagram showing an example of a complex condition including a logical sum between comparisons. Numbers ①-⑧ indicate the subconditions, respectively of the condition. (Refer to the IF part of FIG. 12 for details.) In this case, $(3^2)^2 = 81$ subconditions will be established.

FIG. 13 is a diagram illustrating a network generated from the subconditions.

Figure 14:
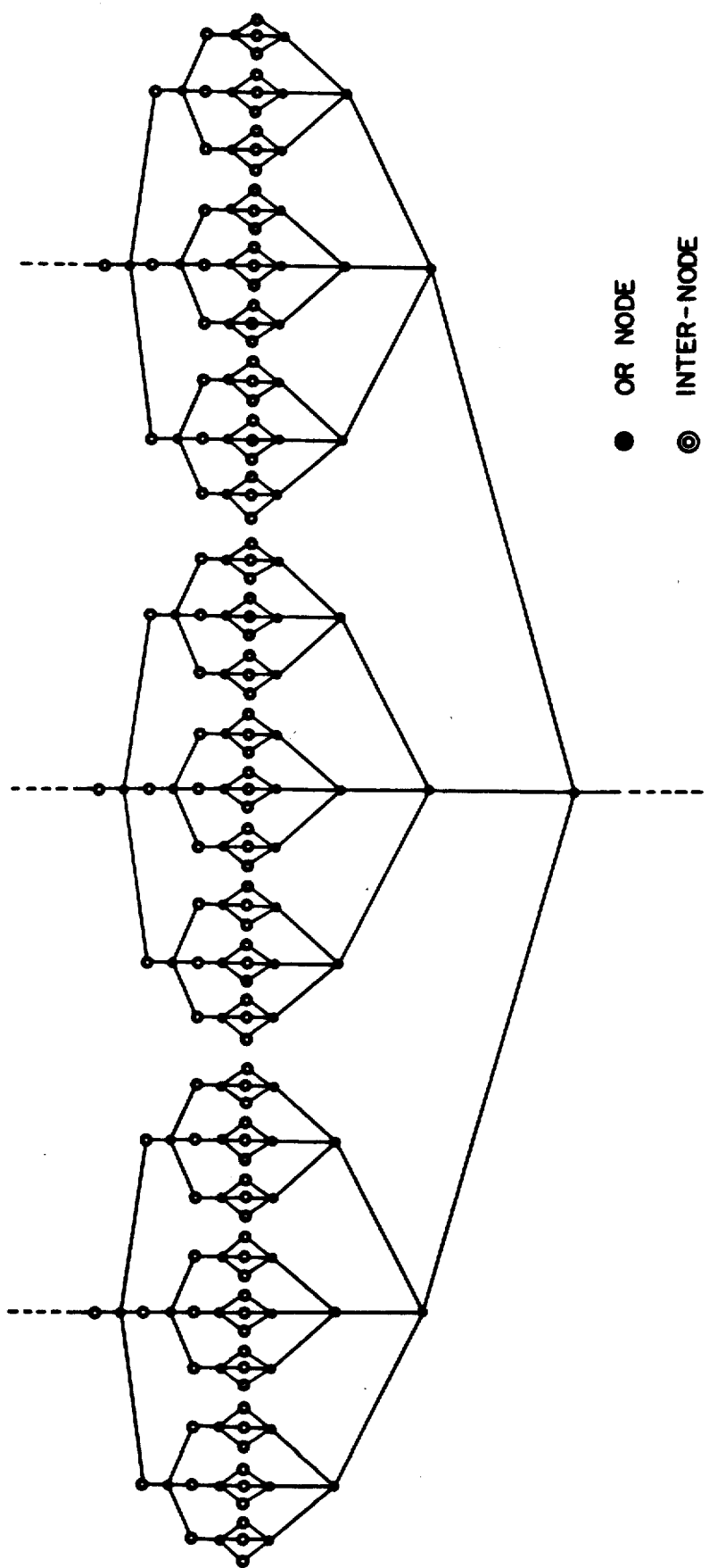
FIG. 14 is a schematic diagram demonstrating a network for effecting the 81 combinations derived from FIG. 11.

FIG. 14 is a schematic diagram depicting an overall network including all subnetworks as shown in FIG. 13. To generate such a large network, a large-sized memory and a long processing time will be necessary.

Figure 15:
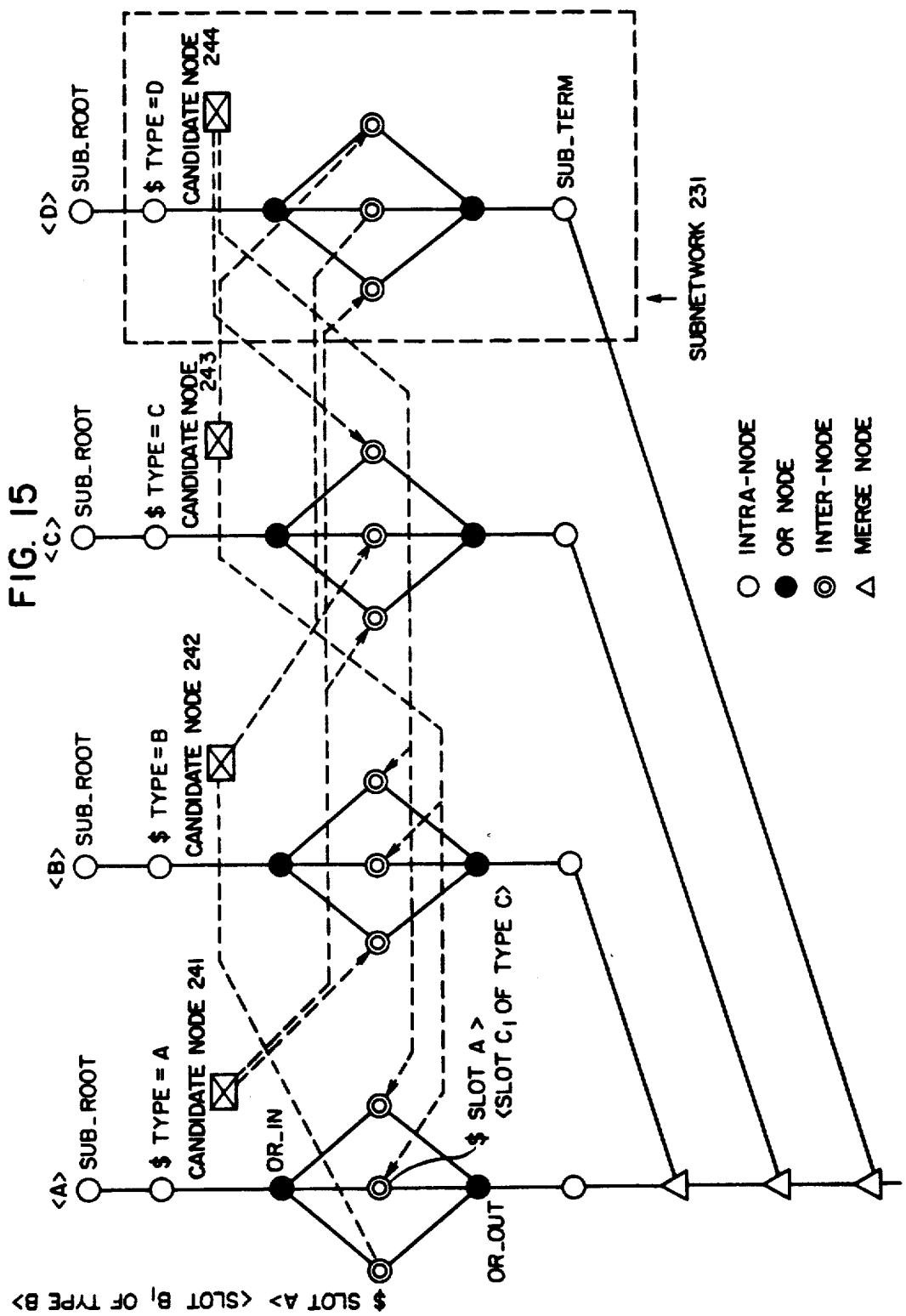
FIG. 15 is a diagram of a network generated by use of candidates nodes in place of the 81 combinations of FIG. 11 wherein the network is divided into four subnetworks, which is integrated into the network.

FIG. 15 is a diagram illustrating a network representing the condition of FIG. 11 in which candidate nodes 241-242 are disposed according to the embodiment of the present invention.

In FIG. 15, the broken lines indicate paths through which candidate data kept in the CAN_NODE are delivered in a network where OR nodes and intranodes are complicatedly incorporated.

In such a complex network, the token processing in four subnetworks A, B, C, and D can be executed independently of each other, which consequently enables to minimize the network and the working memory and to speed up the overall processing.

For the system performance, it is desirable to keep in the candidate nodes the data which is quite likely to satisfy the pertinent condition.

We claim:

1. In a system in which a plurality of complex conditions for object data of a plurality of objects each including a data name and at least a pair of an attribute name and attribute data are judged whether said object data satisfy said complex conditions with an aid of a network of a structure having nodes representing respective conditions for said object data, said nodes including an intra node representing an intra condition for an intra comparison between a constant and a data value of a given one of said objects and an inter node representing an inter condition for an inter comparison between data of different ones of said objects, said judging being sequentially performed in a top-down manner, starting from a top point of said network according to a method, performed by a computer, comprising steps of:

converting each of a plurality of conditional clauses of statements describing said conditions for said object data into a plurality of independent subnetworks by using virtual nodes which link conditional clauses related to one another for allowing relevant conditions of said conditions to be handled independent of one another, said virtual nodes storing objects satisfying conditions and objects not satisfying a condition at said inter node;

integrating said subnetworks into a network of said structure; and making a judgment to determine whether or not said conditions are satisfied by using said stored objects at said virtual nodes in conformity with an integrated network.

2. A method according to claim 1, wherein each of said virtual nodes comprises a candidate node which is provided for one of said subnetworks which is referred to by another of said subnetworks for the condition at said inter node wherein said candidate node stores said object data likely to pass through another subnetwork, and a merge node which is used to link one subnetwork to said another subnetwork and to represent integrity check conditions for mergeability between said subnetworks indicating whether outputs of said subnetworks can be merged.

3. A method of judging a plurality of conditions as to whether the conditions are satisfied by tokens with an aid of a system represented by a plurality of nodes, wherein said nodes sequentially receives said tokens each including an object data name and at least a pair of an attribute name and attribute data, performs a comparison based on a condition given thereto and stores a result of the comparison, said nodes including an inter-node representing an intra condition for an intra comparison between a constant and a data value of a given one of said tokens and an inter node representing an inter condition for an inter comparison between data of different ones of said tokens, said method, performed by a computer, comprising steps of:

(a) converting conditional clauses of statements, describing the conditions, into subnetworks which are independent of one another;

(b) providing a candidate node for storing tokens which satisfy the conditions and tokens which do not satisfy the conditions at said inter node;

(c) providing, after steps (a) and (b), a merge node for linking independent subnetworks in order to check mergeability between the subnetworks.

4. A method according to claim 3, wherein said step of providing a candidate node includes a step of holding the attribute data of a token passing through the subnetworks which refer to said attribute data related to a token stored in said candidate node; said method, performed by a computer, further comprising a step of:

receiving a token for comparing said attribute data of a received token with said attribute data stored in said candidate node instead of the attribute data in the subnetworks.

5. A method according to claim 3, wherein said step of providing a candidate node further includes a step of:

storing beforehand in said candidate node attribute data most likely to be utilized for comparison in said subnetworks.

6. A method, performed by a computer, of generating a network in which a plurality of nodes are linked in a tree structure and which receives tokens and compares the tokens with predetermined conditions, comprising steps of:

(a) converting each of a plurality of complex conditional clauses of statements describing said predetermined conditions into subnetworks independent of one another, each of said subnetworks being in a structure having a plurality of nodes linked in a form of a tree;

(b) comparing an attribute or slot data of one token in one of said conditional clauses with an attribute or slot data belonging to data of another token in another conditional clause to thereby derive the attribute or slot data belonging to the data of said another token; and (c) providing a candidate node for storing said attribute data of said another token which has already passed through the subnetworks representing said another conditional clause in the form of a tree structure of the nodes.

7. A method, performed by a computer, of representing condition parts of a rule including conditional clauses regarding objects each having an object name and at least one pair of an attribute name and an attribute value in a form of a network, comprising steps of:

(a) representing an intra comparison between a constant and a value of an object as an intra node in said network and representing an inter comparison between values of different objects as an inter node in said network;

(b) providing, after said step (a), a candidate node to a conditional clause, having a value that is referred to in an inter comparison in another conditional clause;

(c) linking said inter node with said candidate node, and (d) merging, after said steps (a), (b) and (c), subnetworks each representing one of said conditional clauses into said network.

8. A method according to claim 7, further comprising steps of:

(e) memorizing in said candidate node both an object satisfying conditions at all nodes in a subnetwork and an object not satisfying a condition at said inter node;

(f) judging whether a condition at the inter node is satisfied based on said objects memorized in said candidate node; and (g) realizing combinations of objects which satisfy said condition by eliminating any object not satisfying said condition of said inter node by way of said merge node.

* * * * *